United States Patent [19]

von Meyerinck et al.

[11] Patent Number: 4,993,463
[45] Date of Patent: Feb. 19, 1991

[54] SINKABLE FUELLING SYSTEM

[76] Inventors: Wolfgang von Meyerinck, Daubringer Strasse 43, D-6304 Lollar; Dietz von Meyerinck, Arnsburger Strasse 14, D-6302 Lich 2, both of Fed. Rep. of Germany

[21] Appl. No.: 386,576

[22] Filed: Jul. 28, 1989

[30] Foreign Application Priority Data

Apr. 20, 1989 [DE] Fed. Rep. of Germany ... 8904997[U]

[51] Int. Cl.$^5$ .............. B65B 3/04; B67D 5/70
[52] U.S. Cl. .................. 141/387; 141/279; 141/382; 137/234.6; 137/363; 137/615
[58] Field of Search ........... 141/1, 98, 113, 279, 141/284, 383–389, 392; 137/363, 372, 234.6, 899, 615, 899.2

[56] References Cited

U.S. PATENT DOCUMENTS

| | | | |
|---|---|---|---|
| 1,867,602 | 7/1932 | Stukenborg | 137/363 |
| 2,642,957 | 6/1953 | Watts, Jr. et al. | 137/234.6 |
| 2,948,306 | 8/1960 | Kuraeff | 141/388 |
| 4,130,134 | 12/1978 | Castle | 137/615 |
| 4,202,372 | 5/1980 | Gibbons | 137/615 |
| 4,269,240 | 5/1981 | Cutore | 141/392 |
| 4,658,873 | 4/1987 | von Meyerinck et al. | 141/387 |
| 4,658,874 | 4/1987 | von Meyerinck et al. | 141/387 |
| 4,844,121 | 7/1989 | Duke | 137/615 |
| 4,844,133 | 7/1989 | von Meyerinck et al. | 141/387 |

Primary Examiner—Henry J. Recla
Assistant Examiner—Casey Jacyna
Attorney, Agent, or Firm—Flynn, Thiel, Boutell & Tanis

[57] ABSTRACT

The invention relates to a fuelling system comprising a fuelling arm composed of several pipe elements, which each are connected with one another through a joint having one degree of freedom, and which is connected to a supply line. The supply line is arranged inside a vertically opening enclosed space. The fuelling arm is liftable and lowerable to ground level by means of a lifting and lowering device. In order to assure a fuelling radius which is as large as possible, and on the other hand in order to be able to completely move the fuelling system during nonuse to an out of the way location, the lifting and lowering device includes a plate liftable to a position flush with respect to the ground, on which plate is supported a first joint pivotal about a vertical axis. The respective adjoining pipe elements are horizontally arranged, are angled at their ends and are each connected with one another by means of at least one vertical joint. The dimension of the plate equals at least the length of the longest pipe element. The fuelling arm can thus be collapsed above the plate and can be lowered together with the plate into the vertically enclosed space.

11 Claims, 5 Drawing Sheets

SINKABLE FUELLING SYSTEM

FIELD OF THE INVENTION

The invention relates to a fuelling system which includes a fuelling arm composed of several pipe elements connected with one another through an element having one degree of freedom, and which is connected at one end to a supply line. The supply line is arranged in a vertically enclosed space. The fuelling arm is liftable and lowerable relative to ground level through a lifting and lowering device. A fuelling system of this type is known from U.S. Pat. No. 4,658,874.

BACKGROUND OF THE INVENTION

Fuelling systems of the mentioned type must, if they are used for fuelling of aircraft, meet substantially two primary requirements. The first primary requirement is that the fuelling arm can be extended to a sufficient length, so that fuelling of both very large aircraft and aircrafts which are not exactly parked at the parking position is possible. The other requirement is that the fuelling system, during nonuse, must be able to be stored as space-savingly and operatively safe as possible and yet be protected against outside influences.

It has proven to be disadvantageous in known fuelling systems to cause the individual pipe elements of the fuelling arm to be relatively bulky since they can often be connected to the aircraft only with a considerable amount of work. Furthermore, to make the movability of the fuelling arm easier, undercarriages are often used, on which at least parts of the fuelling arm are supported in order to facilitate a pulling or pushing of the undercarriages to and from the aircraft. All this has the result that the fuelling arm, in an inoperative state, can hardly be collapsed or is at least difficult to collapse, so that it can be stored space-savingly. All of these movable systems in addition have the disadvantage that they must be transported to the edge of the hydrant surface when not in operation. In the case of the fuelling arm known from the above-mentioned patent, it has proven to be disadvantageous for the fuelling arm to be lowered and to be only of a relatively short length, which is not sufficient for many purposes.

A further disadvantage of both of these just mentioned and also other fuelling arms is that these are not sufficiently elevationally adjustable in order to connect a fuelling coupling mounted on the free end of the fuelling arm to the tank connection of various aircraft.

The basic purpose of the invention is to provide a raisable and lowerable fuelling system of the above-mentioned type which, with a simple design and easy operation, secures a large fuelling range and can be stored space-savingly during nonuse and can be lowered into the ground through a comparatively small, closable opening, which can be covered with a heavy-load bearing cover over which travel can take place.

The purpose is attained according to the invention by a lifting and lowering device including a plate liftable to a position flush with respect to the ground, on which plate is supported a first joint pivotal about a vertical axis, by the respectively adjoining pipe elements being arranged each substantially horizontally, being angled at their ends and being connected with one another each by at least one vertical joint, and by the dimension of the plate equalling at least the length of the longest pipe element.

The inventive fuelling system is characterized by a number of significant advantages. Since the fuelling arm or rather its pipe elements are dimensioned such that the fuelling arm can be arranged, in an inoperative state, completely above the plate, it is possible to lower the entire fuelling arm including the plate into a vertically opening enclosed space or shaft in an airport apron. Thus, the entire apron of the aircraft is kept clear during nonuse, so that the aircraft can roll unhindered and that the servicing personnel and the operators are not hindered by the fuelling system. A further significant advantage of the inventive fuelling system is that same does not present a danger for an accident in the inoperative state, so that no measures need to be taken to prevent a collision with the fuelling system. This is of a particular advantage during poor visibility or heavy traffic on an apron or the runways. Furthermore, it has proven to be advantageous that the fuelling system can be received completely in the vertically enclosed space during the inoperative state and thus occurring fuel residues or vapors can be absorbed without burdening the environment.

In the operative state in which the plate is lifted to ground level of the apron or of the runway, there also does not exist the danger that persons will fall into the open shaft. This is particularly important when the fuelling arm is pivoted to assume its fuelling position. In particular during pivoting of the first pipe arm, there exists in the case of the known fuelling arms arranged in a substantially open shaft the danger that an operator will fall into the shaft.

A particularly favorable further development of the invention provides that at least one of the pipe elements is supported by a support wheel. The support wheel can be used to support a portion of the fuelling arm, however, it does not hinder the free unfolding capability of the fuelling arm or rather of its arrangement on the plate and the lowering of the fuelling arm together with the plate during nonuse.

In order to facilitate the collapsing of the fuelling arm when the fuelling arm is very long and a plurality of individual pipe elements exist, there is provided, according to the invention, a first and a third pipe element arranged at the same level and a second pipe element and a fourth pipe element arranged at different levels with respect to the first and the third pipe elements. The first and the third pipe elements can be arranged substantially parallel or side-by-side on the plate, while the second and the fourth pipe elements must be arranged in an inclined position above the first and the third pipe elements. This makes it possible to arrange the pipe elements in the smallest space. It has proven to be advantageous in this described embodiment when the third pipe element is supported by means of a support wheel. Since this pipe element, in relationship to the other pipe elements, is the lowest one, it can be supported by means of the support wheel without the pivotability of the remaining pipe elements and their collapsibility above the plate being hindered.

In order to assure that there is a capability to adjust the height of the inventive fuelling arm, at least one pipe element can be pivoted about a horizontal joint arranged transversely with respect to the longitudinal axis of the pipe element. The second pipe element is constructed such that it is pivotal on both sides each about a horizontal axis.

To permit, in the case of the inventively possible great length of the fuelling arm, an easier elevational adjustability of the free end area, there is provided, according to the invention, an elevation-adjusting device on the support wheel on the third pipe element.

The pipe element lying between the first and the third pipe elements, which is connected through horizontally lying joints directly thereto, forms with a guide rod which interconnects the first and third pipe sections, a parallelogram. This parallelogram assures that the two vertical joints, which are connected thereafter, always lie vertically also during an elevational adjustment. The advantage is that the fuelling coupling is always pivotal about a vertical joint and thus an undesired changing to the lowermost point cannot occur. Furthermore, it is possible to reduce the number of support wheels.

The pipe elements arranged after the fourth pipe element are preferably pivotal alternately about horizontal or rather vertical joints, each offset at 90° to one another, and are arranged above the first to fourth pipe elements. Since the shaft into which the fuelling arm is to be lowered can be sufficiently deep, the total height of the fuelling arm collapsed during nonuse is not so important. Of decisive importance is rather the surface area of the fuelling arm needed in the collapsed state.

The recess for the plate can be covered in a preferred manner by a weight-balanced lid over which, in the closed state, also heavy aircraft can travel and which can easily be opened or closed by one operator.

In order to assure a free lifting and lowering of the plate, it is particularly advantageous when the supply line is connected to a connecting pipe element bent at its ends through a joint pivotal about a horizontal axis. The free end of the connecting pipe element is connected to a further joint pivotal about a horizontal axis, which joint in turn is connected through an intermediate pipe section to the first joint pivotal about the vertical axis. This development results in a scissorlike pipe connection which does not offer much resistance to a vertical movement of the plate.

BRIEF DESCRIPTION OF THE DRAWINGS

The invention will be described hereinafter with reference to the exemplary embodiments illustrated in the accompanying drawings, in which.

DETAILED DESCRIPTION

Figure 1:
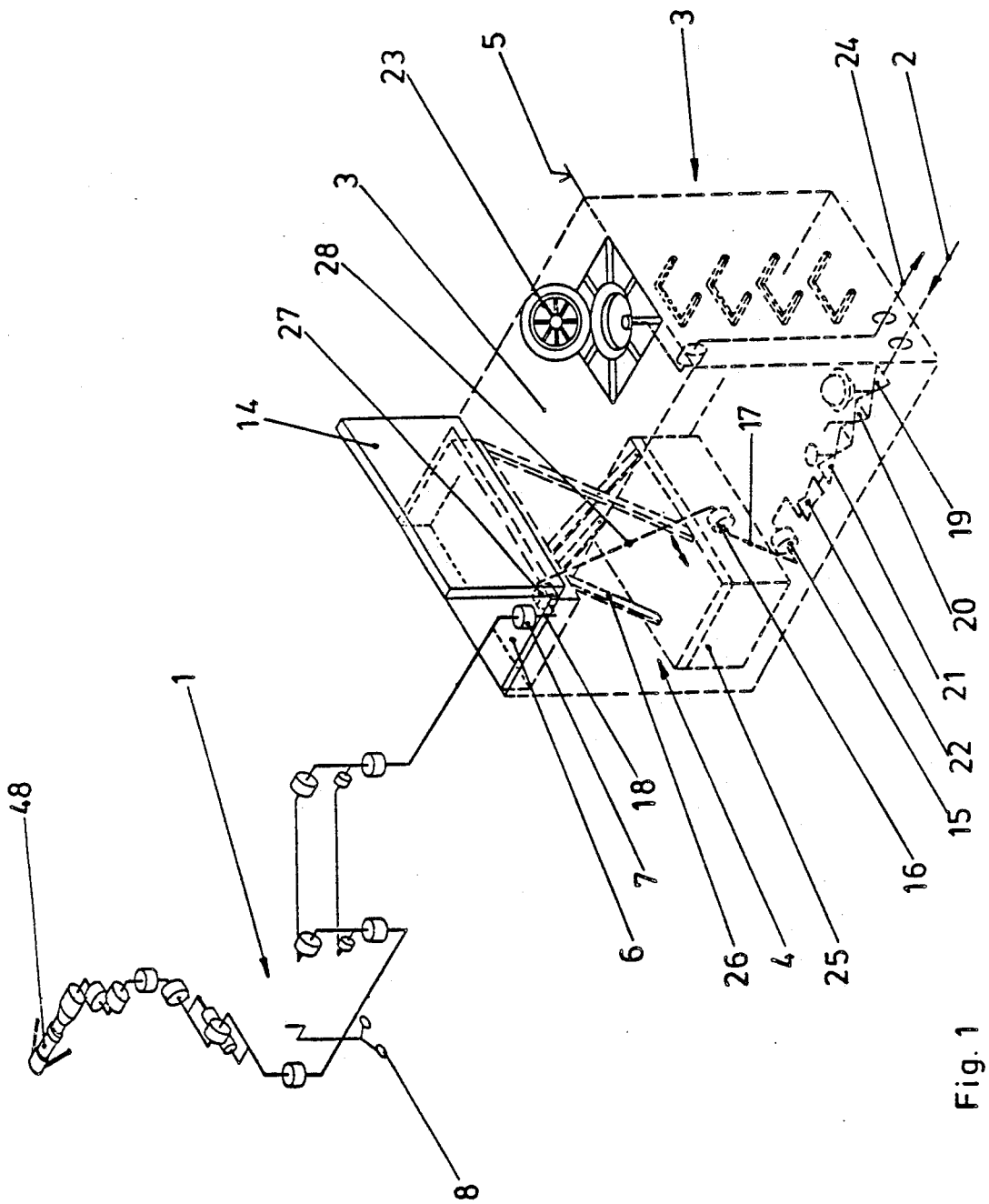
FIG. 1 is a schematic illustration of the inventive fuelling system in a raised operative state during the fuelling of an aircraft.
Figure 2:
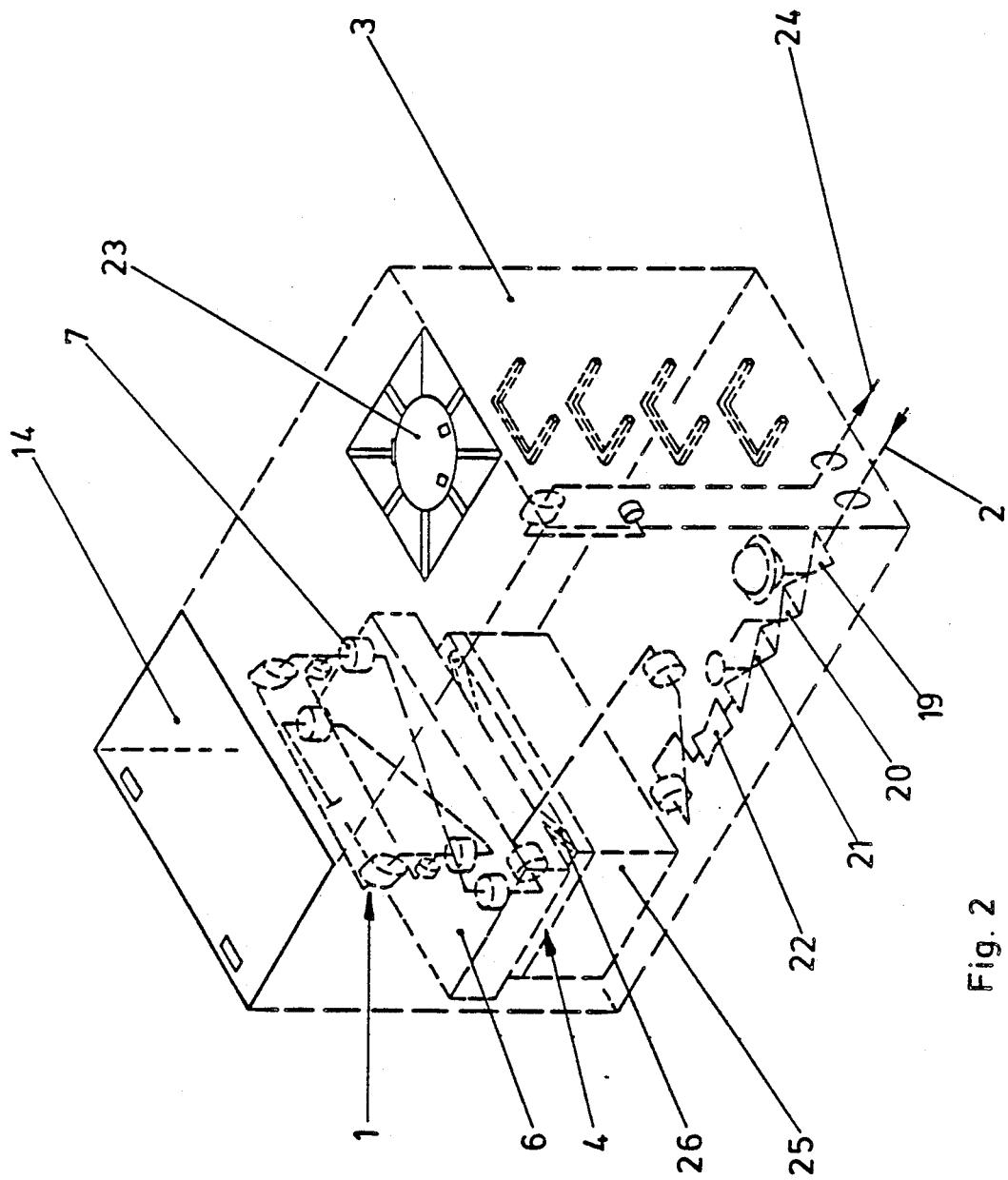
FIG. 2 is a schematic illustration of the fuelling system shown in FIG. 1 in the nonoperative, lowered or collapsed state.

FIGS. 1 and 2 illustrate the inventive fuelling system in a schematic manner. In particular the exact arrangement of the pipe elements, joints and others shown in FIGS. 3 to 5 were left out here for the purpose of a clearer illustration.

The inventive fuelling system includes a fuelling arm 1, which is connected to a plate 6 through a first joint 7 pivotal about a vertical axis. The plate 6 can be lowered into a vertically opening enclosed space or shaft 3 in the ground from ground level 5 by means of a lifting and lowering structure 4 (see FIG. 2), when the fuelling arm is collapsed above the plate 6 and is in its inoperative state.

A supply line 2 is arranged in the shaft adjacent the bottom thereof, which supply line 2 includes a conventional pressure-balancing device 19, a conventional blocking armature 20 (for blocking the supply line 2 during repair work), a fuelling valve 21 and a Venturi tube 22.

A manhole cover 23 is provided for facilitating entry into and opening 23A and the interior of the shaft 3 and a return and emptying line 24 are furthermore provided adjacent the upper end of the shaft.

The lifting and lowering structure 4 includes a base plate 25 on which a scissors mechanism 26 is supported, which scissors mechanism 26 can be operated, for example, by pneumatic, hydraulic or other devices (not illustrated). The plate 6 is supported on the upper side of the scissors mechanism 26.

In order to make possible a lifting or a lowering of the plate 6, a joint 15 is provided on the supply line 2 and which is pivotal about a horizontal axis. The joint 15 is connected to a connecting pipe element 17, the ends of which, as this is illustrated, are each angled at 90° to the central portion, are arranged in a common plane and extend in opposite directions. The free end of the connecting pipe element 17 is connected to a joint 16 which is pivotal about a horizontal axis. An intermediate pipe section 28 follows the joint 16, the ends of which intermediate pipe section 28, similar to the connecting pipe element 17, are also arranged at a right angle to the central portion thereof. At least one further joint 27 pivotal about a horizontal axis is provided at the end of the intermediate pipe section 28. The intermediate pipe section 28 then connects the joint 27 to the first joint 7 arranged on the plate 6.

FIG. 2 illustrates the arrangement shown in FIG. 1 in a schematic manner in a collapsed, inoperative state. It is thereby in particular noticeable that the fuelling arm 1 is collapsed and oriented entirely above the plate 6 and can be lowered together with the plate 6 into the shaft 3.

To cover the hole formed when the plate 6 is lowered, a weight-balancing shaft lid 14 is used.

Figure 3:
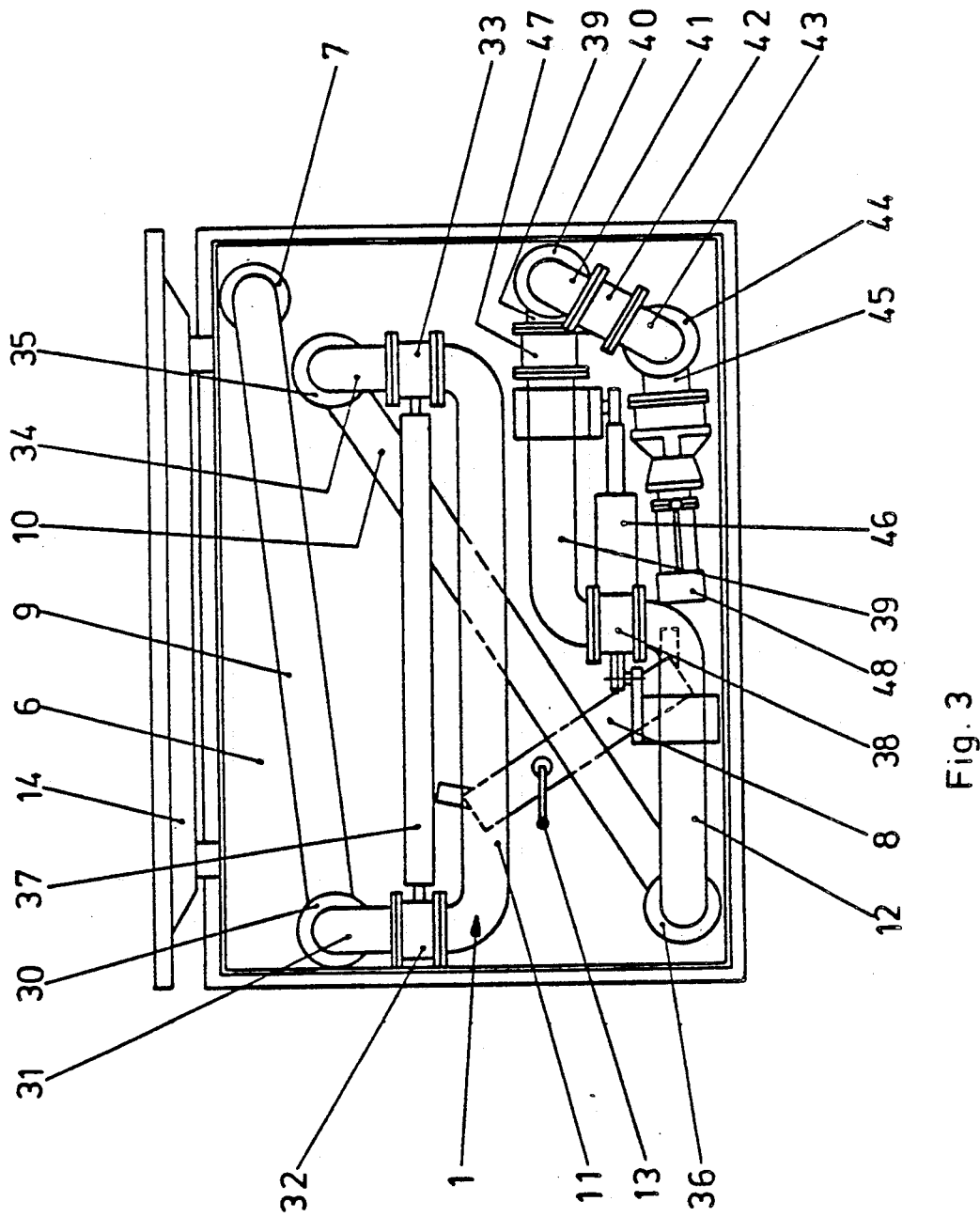
FIG. 3 is a top view of an exemplary embodiment of the inventive fuelling arm in a collapsed, inoperative state.
Figure 4:
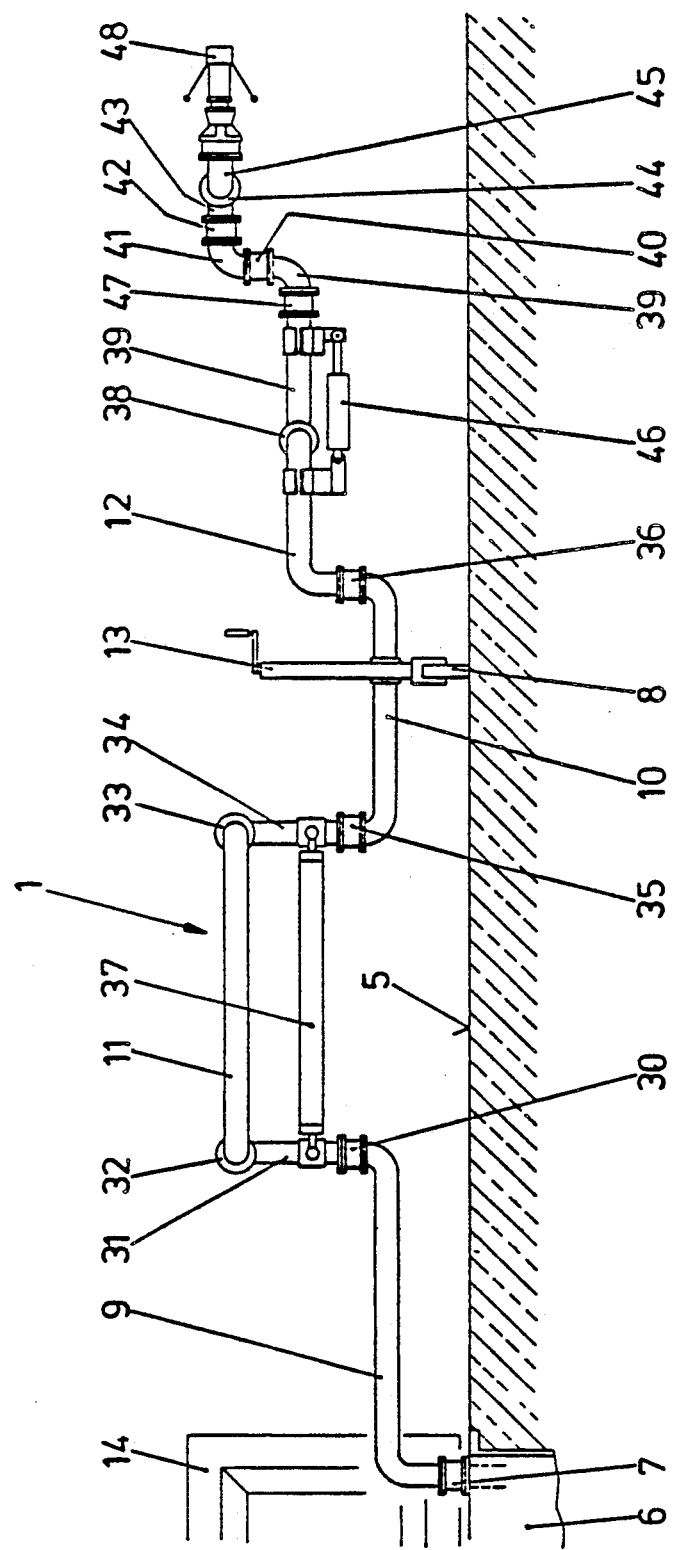
FIG. 4 is a side view of the fuelling arm shown in FIG. 3 in an extended state.
Figure 5:
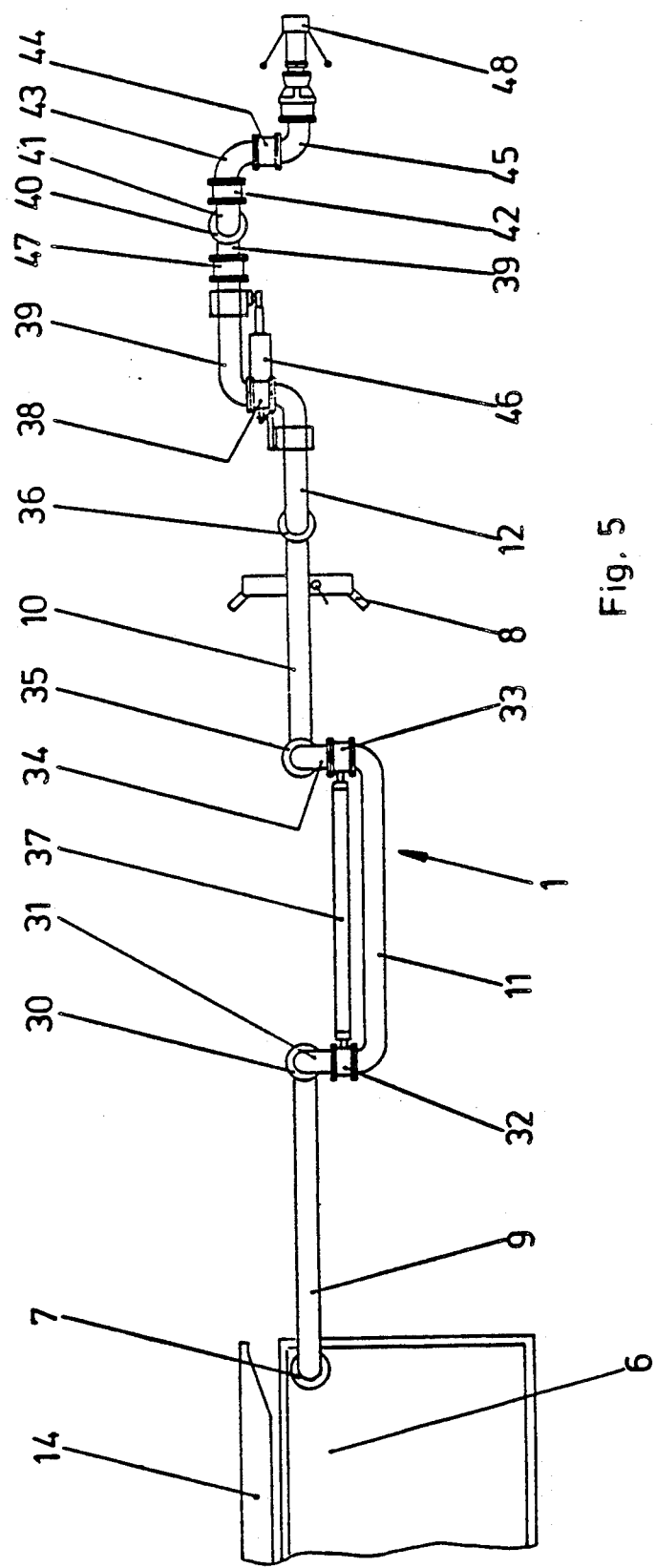
FIG. 5 is a top view of the arrangement according to FIG. 4.

FIGS. 3 to 5 illustrate each a concrete exemplary embodiment of the inventive fuelling arm. A pipe section 9 is connected to the first joint 7, the ends of which pipe section are each angled at 90° relative to the central portion and are arranged in a common plane. The first pipe element 9 is followed by a joint 30 which is pivotal about a vertical axis. A pipe section 31 is connected to the joint 30, which pipe section 31 is bent at a right angle and is followed by a joint 32 permitting a pivoting about a horizontal axis. A second pipe element 11 is connected to the joint 32, the ends of which second pipe element 11 are each bent at 90°, lie in a common plane and extend in the same direction. A joint 33 is arranged after the second pipe element 11, which joint 33 permits a pivoting about a horizontal axis. A right angle pipe section 34 follows the joint 33, which pipe section 34 is followed by a joint 35 pivotal about a vertical axis. The pipe sections 31 and 34 are connected by a guide rod 37 arranged parallel to the pipe element 11. Thus, the pipe sections 31, 34, the guide rod 37 and the pipe element 11 form a parallelogram. This assures that the joints 30 and 35 are always vertically aligned. A third pipe element 10 follows the joint 35, the ends of which third pipe element 10, similar to the second pipe element 11, are both angled at 90° and are arranged to extend in the same direction. The third pipe element 10 is followed by a joint 36 pivotal about a vertical axis, which joint 36 is connected to a fourth pipe element 12. The ends of the fourth pipe element 12 are each angled at 90° and are arranged in different planes. The parallelogram construction, including the pipe sections 31, 34, guide rod 37 and pipe element 11, also serves to keep the joint 36 aligned with the vertical axis.

The first and the third pipe elements 9, 10 are substantially provided at the same horizontal level, with the pipe element 10 being supported on the ground by means of a support wheel 8. The support wheel 8 of the third pipe element 10 is provided with an elevation-adjusting device 13, which can be constructed for example in the form of a manually operable adjusting spindle. In the arrangement in the collapsed state illustrated in FIG. 3, the support wheel 8 and the elevation-adjusting device 13 are not shown. FIG. 3 illustrates that the two pipe elements 9 and 10 can each be arranged at the same height substantially side-by-side, while the second pipe element 11 provided at a higher level will lie above the third pipe element 10. The fourth pipe element 12 has, in a similar manner, a greater height than the first and the third pipe elements 9 and 10.

A joint 38 follows the fourth pipe element 12, which joint 38 is pivotal about a horizontal axis. A pipe element 39 follows the joint 38, the ends of which pipe element 39, similar to the first pipe element 9, are each angled at 90°, however, are arranged in planes which are arranged offset at 90° with respect to one another. The pipe element 39 is followed by a joint 40 pivotal about a vertical axis, which joint 40 is connected to a pipe section 41 bent at 90°.

A weight-balancing device 46 is provided for the joint 38 by interconnecting the pipe sections 12 and 39, which weight-balancing device 46 assures a free balancing of the pipe sections 39 up to the fuelling coupling 48.

The further development of the inventive fuelling arm is not illustrated in detail in FIG. 3 in order to better show the collapsibility of the fuelling arm. Only a fuelling coupling 48 provided at the free end of the fuelling arm is illustrated.

The pipe section 41 is followed by a joint 42 pivotal about a horizontal axis, which joint 42 is connected to a pipe section 43 bent at 90°. A joint 44 follows the pipe section 43, which joint 44 is pivotal about a horizontal axis and to which joint a pipe section 45 is connected. The pipe section 45 is also angled at 90°. The fuelling coupling 48 is secured to the end of the pipe section 45.

An additional horizontally lying blockable joint 47 can be inserted into the pipe element 39 for an additional lowering.

The inventive fuelling system thus facilitates an extending of the fuelling arm to a very great length and in particular to adjust it at its free end area to the differently required fuelling heights. Furthermore, the fuelling arm can be collapsed in a simple manner such that it can be arranged above the plate and can be lowered together with the plate into the shaft.

The invention is not to be limited to the illustrated exemplary embodiments, rather many modification possibilities exist for the man skilled in the art within the scope of the invention.

The embodiments of the invention in which an exclusive property or privilege is claimed are defined as follows:

1. In a fuelling system comprising a fuelling arm composed of several pipe elements connected with one another each through a joint having one degree of freedom, and which is connected at one end to a supply line, said supply line being arranged inside a vertically opening enclosed space, said fuelling system further including lifting and lowering means for lifting and lowering said fuelling arm to and below ground level, the improvement wherein said lifting and lowering means includes a plate liftable by said lifting and lowering means to a position flush with respect to the ground, on which plate is supported a first joint pivotal about a vertical axis and at least first, second and third elongated pipe elements, said first pipe element having a first horizontally extending extension and first and second ends, said first end being bent at 90° and coupled in said first joint so that said first pipe can swing about said vertical axis of said first joint, said second end being bent at 90° in a direction opposite said first end and lying in the same plane as said first end, said second pipe element having a second horizontally extending extension and third and fourth ends, said third end and said fourth end of said second pipe element both being bent at 90° and in the same horizontal direction, said third pipe element having a third horizontally extending extension and fifth and sixth ends, first and second pipe sections each having a right angle section thereon, a second joint for coupling said second end to one end of said first pipe section, a third joint for coupling said third end to the other end of said first pip section, a fourth joint for coupling said fourth end to one end of said second pipe section and a fifth joint for coupling said other end of said second pipe section to said fifth end of said third pipe element, a sixth joint for coupling said sixth end on said third pipe element to an end of said fuelling arm opposite an outlet end thereof, said second, fifth and sixth joints being pivotal joints, each allowing pivotal movement of the connected pipes about a vertical axis parallel to said vertical axis of said first joint, a guide rod connected to and extending between said first and second pipe sections so that a parallelogram is defined by said first and second pipe sections, said second pipe element and said guide rod, a ground engaging support wheel and support means therefor, said support means being mounted on said at least one of said connected pipe elements radially spaced from said first joint to support and space said first, second and third pipe elements from the ground, said first, second and third pipe elements being pivotal with respect to one another about said vertical axes of said second, fifth and sixth joints so as to be movable to a collapsed position wherein all of said several pipe elements are oriented directly above said plate, one of the dimensions of said plate equalling at least the length of the longest of said first, second and third pipe elements.

2. The fuelling system according to claim 1, wherein said first and said third pipe elements of said connected pipe elements are arranged at the same level, and wherein said second pipe element and said one end of said fuelling arm are arranged at different heights with respect to said first and said third pipe elements.

3. The fuelling system according to claim 2, wherein at least one pipe element is pivotal about a horizontal joint arranged transversely with respect to the longitudinal axis of the pipe element.

4. The fuelling system according to claim 3, wherein said second pipe element is supported at both of said third and fourth joints pivotally about a horizontal axis.

5. The fuelling system according to claim 2, wherein further pipe elements of said fuelling arm are pivotal alternately about horizontal and vertical joints each offset at 90° to one another.

6. The fuelling system according to claim 5, wherein a pipe section of said further pipe elements is connected to said third pipe element and the weight thereof is balanced by a weight-balancing device, so that said weight-balancing device keeps said further pipe elements including a fuelling coupling in balance.

7. The fuelling system according to claim 1, wherein said support wheel is connected to said connected pipe elements between said fifth and sixth joints, and wherein said support wheel is provided with an elevation-adjusting device.

8. The fuelling system according to claim 1, wherein said vertically opening enclosed space for said plate is covered by means of a weight-balancing lid.

9. The fuelling system according to claim 1, wherein said lifting and lowering means includes at least one of hydraulic and electric drive means and consists of balancing weights.

10. The fuelling system according to claim 1, wherein said supply line is connected at one of its ends to a connecting pipe element angled at both of its ends through a seventh joint pivotal about a horizontal axis, the other end of said connecting pipe element being connected through an eighth joint pivotal about a horizontal axis, said eighth joint being connected through a ninth joint pivotal about a horizontal axis to a pipe section connected to said first joint.

11. The fueling system according to claim 1, wherein said fuelling system is provided with a Venturi-tube control, a pressure-balancing device, a return and emptying line and a fuelling valve.

* * * * *